(12) United States Patent
Canals Riba et al.

(10) Patent No.: US 7,730,989 B2
(45) Date of Patent: Jun. 8, 2010

(54) SYSTEM TO DISCONNECT A CONTROL PEDAL FROM THE DEVICE TO WHICH IT IS CONNECTED

(75) Inventors: Antoni Canals Riba, Barcelona (ES); Marçal Boquet Carretero, Mataro (ES); Joaquin Nicolas Domingo, Montgat (ES)

(73) Assignee: Flexngate Automotive Iberica, S.A., Les Franqueses Del Valles (ES)

( * ) Notice: Subject to any disclaimer, the term of this patent is extended or adjusted under 35 U.S.C. 154(b) by 698 days.

(21) Appl. No.: 11/578,577

(22) PCT Filed: Apr. 7, 2005

(86) PCT No.: PCT/EP2005/003644
§ 371 (c)(1),
(2), (4) Date: Oct. 16, 2006

(87) PCT Pub. No.: WO2005/100091
PCT Pub. Date: Oct. 27, 2005

(65) Prior Publication Data
US 2007/0235997 A1  Oct. 11, 2007

(30) Foreign Application Priority Data
Apr. 16, 2004  (ES) ............... 200400930

(51) Int. Cl.
*B60K 28/10* (2006.01)
(52) U.S. Cl. ......................... 180/274; 74/512
(58) Field of Classification Search ............. 180/271, 180/274; 74/512, 560; 296/187.05
See application file for complete search history.

(56) References Cited

U.S. PATENT DOCUMENTS

| 6,539,823 | B1* | 4/2003 | Tomono et al. | 74/512 |
| 6,571,659 | B2* | 6/2003 | Choi | 74/512 |
| 6,571,900 | B2* | 6/2003 | Thistleton | 180/274 |
| 6,889,575 | B2* | 5/2005 | Thistleton et al. | 74/512 |
| 2001/0027696 | A1 | 10/2001 | Mizuma et al. | |
| 2003/0172770 | A1* | 9/2003 | Winfield | 74/560 |

FOREIGN PATENT DOCUMENTS

| EP | 1 134 128 | 9/2001 |
| EP | 1 247 710 | 10/2002 |
| EP | 1 344 691 | 9/2003 |
| FR | 2 835 796 | 8/2003 |

* cited by examiner

*Primary Examiner*—Paul N Dickson
*Assistant Examiner*—Robert A Coker
(74) *Attorney, Agent, or Firm*—Sughrue Mion, PLLC

(57) ABSTRACT

System to disconnect a device control pedal (1) from the device to which it is connected, said pedal (1) being connected to the device by a rod (2) whose end (3) is attached to a first spinning body (4) coupled to the pedal (1) and rotatable around an axis (5), the system comprising a second spinning body (6) provided with a pusher element (7), so that when the second spinning body (6) rotates due to a head-on collision of the vehicle, the rod (2) is displaced due to the action of the pusher element (7) so that it is separated from the first spinning body (4) coupled to the pedal (1).

10 Claims, 3 Drawing Sheets

SYSTEM TO DISCONNECT A CONTROL PEDAL FROM THE DEVICE TO WHICH IT IS CONNECTED

CROSS-REFERENCE TO RELATED APPLICATION

This application is a 371 of PCT/EP2005/003644, filed Apr. 7, 2005; the disclosure of which is incorporated herein by reference.

TECHNICAL FIELD OF THE INVENTION

The invention relates to a system to disconnect a device control pedal from the device to which it is connected, particularly applicable to pedals such as the pedal of a vehicle brake device.

BACKGROUND OF THE INVENTION

The patent documents EP1134128 and EP1344691 disclose respective devices which enable a vehicle pedal to be disconnected from the device to which said pedal is connected, if the vehicle crashes. With said devices the pedals move away in the opposite direction to that of the driver's position, protecting him/her from the damage the pedals may cause him/her if part of the vehicle structure is distorted and displaces the pedals in the driver's direction.

In the devices disclosed in the aforementioned patent documents, the pedal is connected to the device by a rod whose end is connected to a spinning body coupled to the pedal and rotatable around an axis. If a crash occurs and distorts part of the vehicle structure, said spinning body, which is directly connected to the vehicle structure by a side arm joined to the body, is forced to rotate causing the breakage of the end of the rod in the device of document EP 1134128; and in the breakage or the separation of the coupling means of the device of document EP 1344691, provided on the spinning body and responsible for keeping the rod and the spinning body joined together in normal conditions.

In both devices, it is the rotation of the spinning body, whereto the end of the rod remains coupled, which causes the subsequent uncoupling of the rod, so that said spinning body must be attached to part of the vehicle structure so that, when the crash occurs, the structure applies a rotating movement to the spinning body whose displacement and torque is sufficient to cause the rod to break or the uncoupling thereof from the same spinning body.

EXPLANATION OF THE INVENTION

The system to disconnect a device control pedal from the device to which it is connected, object of the invention, is particularly applicable to vehicle pedals intended to receive the action of the foot and to transmit the force thereof to the device. In said system the pedal is connected to the device by a rod whose end is attached to a first spinning body coupled to the pedal and rotatable around an axis.

In essence, the system is characterized in that it further comprises a second spinning body provided with a pusher element, so that when the second spinning body rotates due to a head-on collision of the vehicle, the rod is displaced due to the action of the pusher element so that it is separated from the first spinning body coupled to the pedal.

According to another characteristic of the invention, the spin axis of the second spinning body is coincident with the spin axis of the first spinning body coupled to the pedal.

In a preferred embodiment, a portion of the end of the rod attached to the first spinning body is housed in a groove which an end of the first spinning body is provided with, and the system further comprises retention means intended to maintain the rod in said groove.

In accordance with another characteristic of the invention, the second spinning body comprises an essentially flat portion provided with a through-hole which is traversed by said end of the first spinning body, and the pusher element of the second spinning body is formed by a curved wall, the height of its upper edge being variable and adapted to displace, by way of a cam, the rod attached to the first spinning body when the second spinning body rotates around its axis.

Preferably, the retention means are comprised of a tubular body, coaxial to the first spinning body and arranged externally with respect thereto, the tubular body being provided with a prolongation, essentially parallel to its axis, which can be plastically deformed until it is broken when subjected to strain greater than a certain value, which extends through the through-hole of the essentially flat portion of the second spinning body and which is adapted to clasp the rod, preventing it from coming out of the groove of the end of the first spinning body wherein it is housed.

BRIEF DESCRIPTION OF THE DRAWINGS

The attached drawings illustrate, by way of non-limiting example, a preferred embodiment of the system of the invention. In said drawings.

DETAILED DESCRIPTION OF THE DRAWINGS

Figure 1:
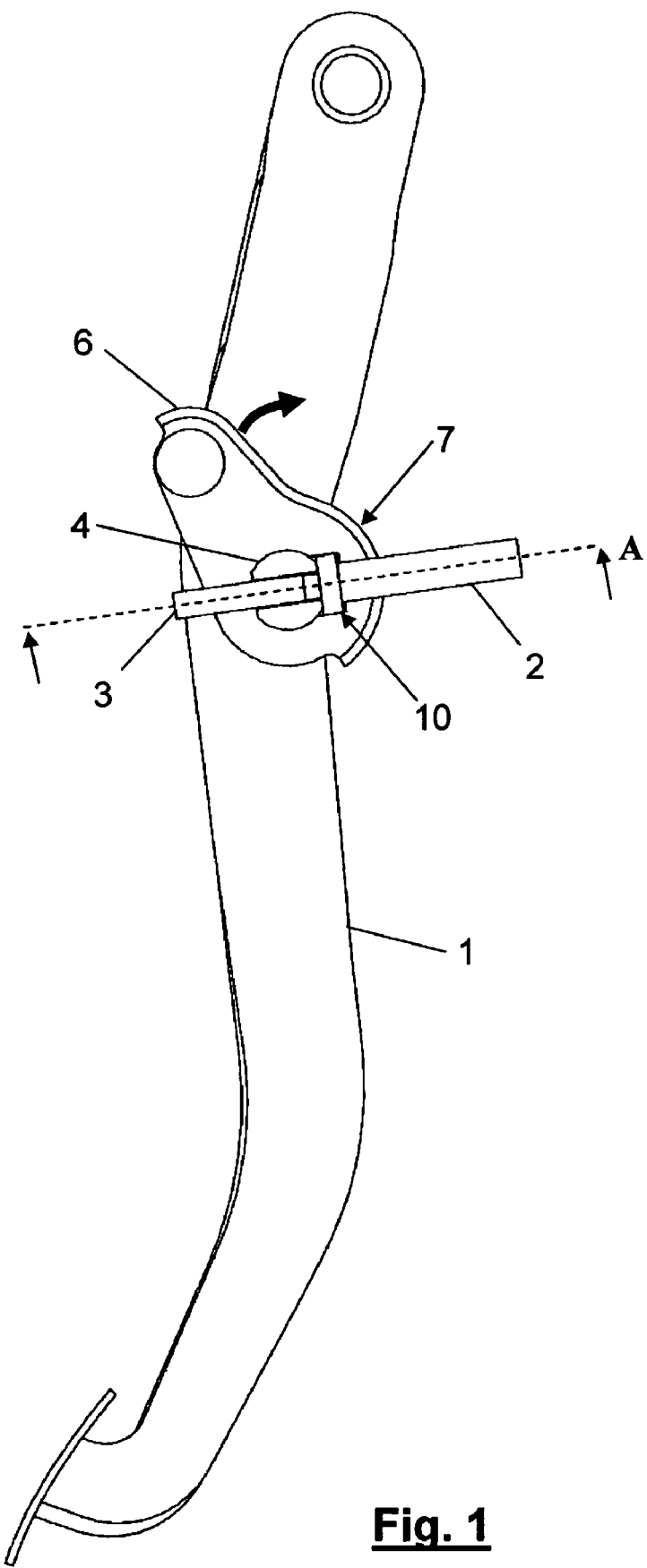
FIG. 1 is a side view of the system to disconnect a device control pedal from the device to which it is connected, according to the invention.

The example system represented in FIG. 1 comprises a pedal 1 which is adapted to control a device 20 (see FIG. 3) using a rod 2, where one of the rod's ends is connected to said device, whilst its opposite end 3 is connected to the pedal 1, 50 that when the pedal 1 receives the action of a driver's foot, and displaces it, the force applied to the pedal is transmitted via the rod 2 to said device.

Figure 2:
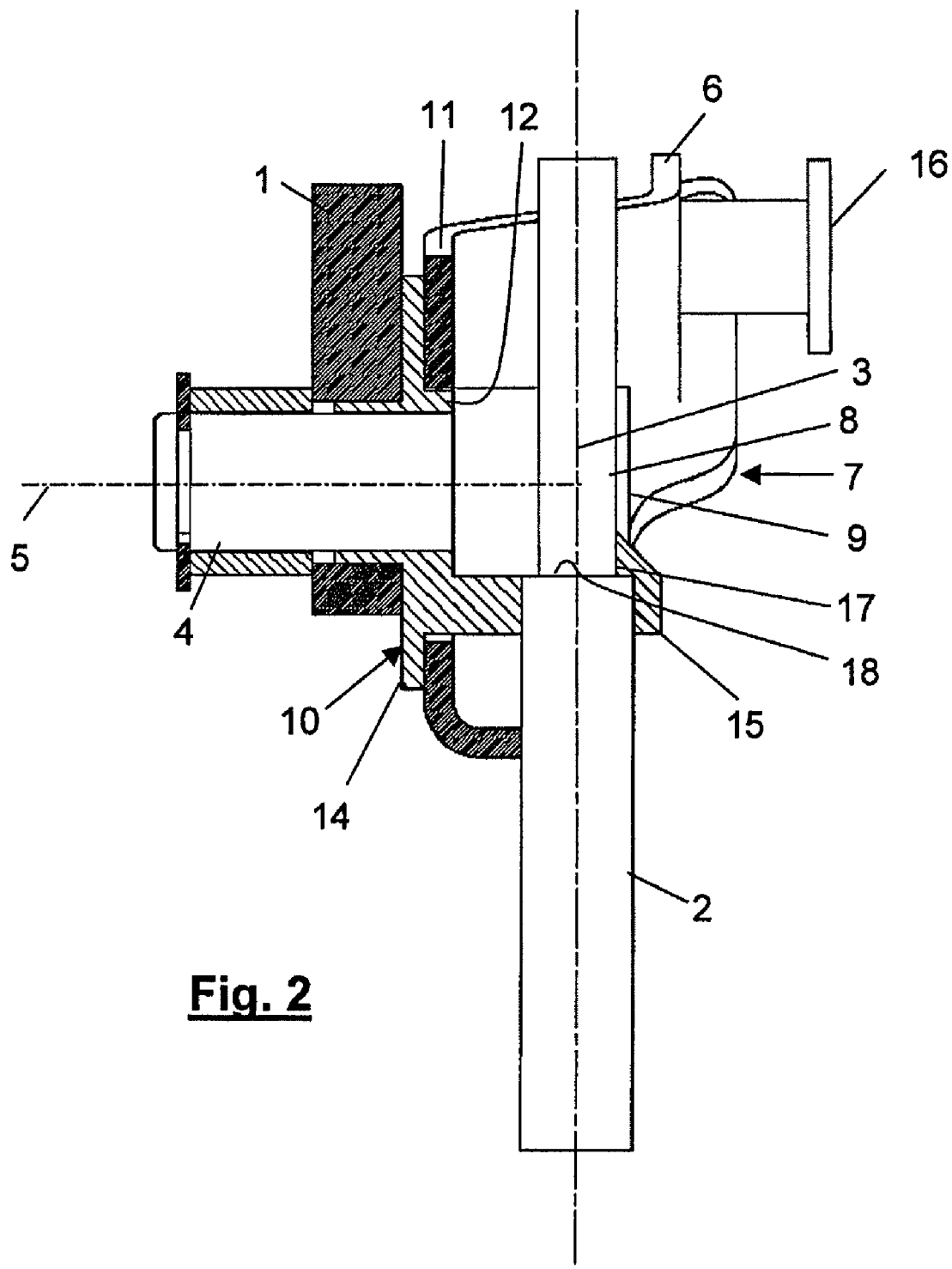
FIG. 2 is a cutaway view according to A, of the system of FIG. 1.
Figure 3:
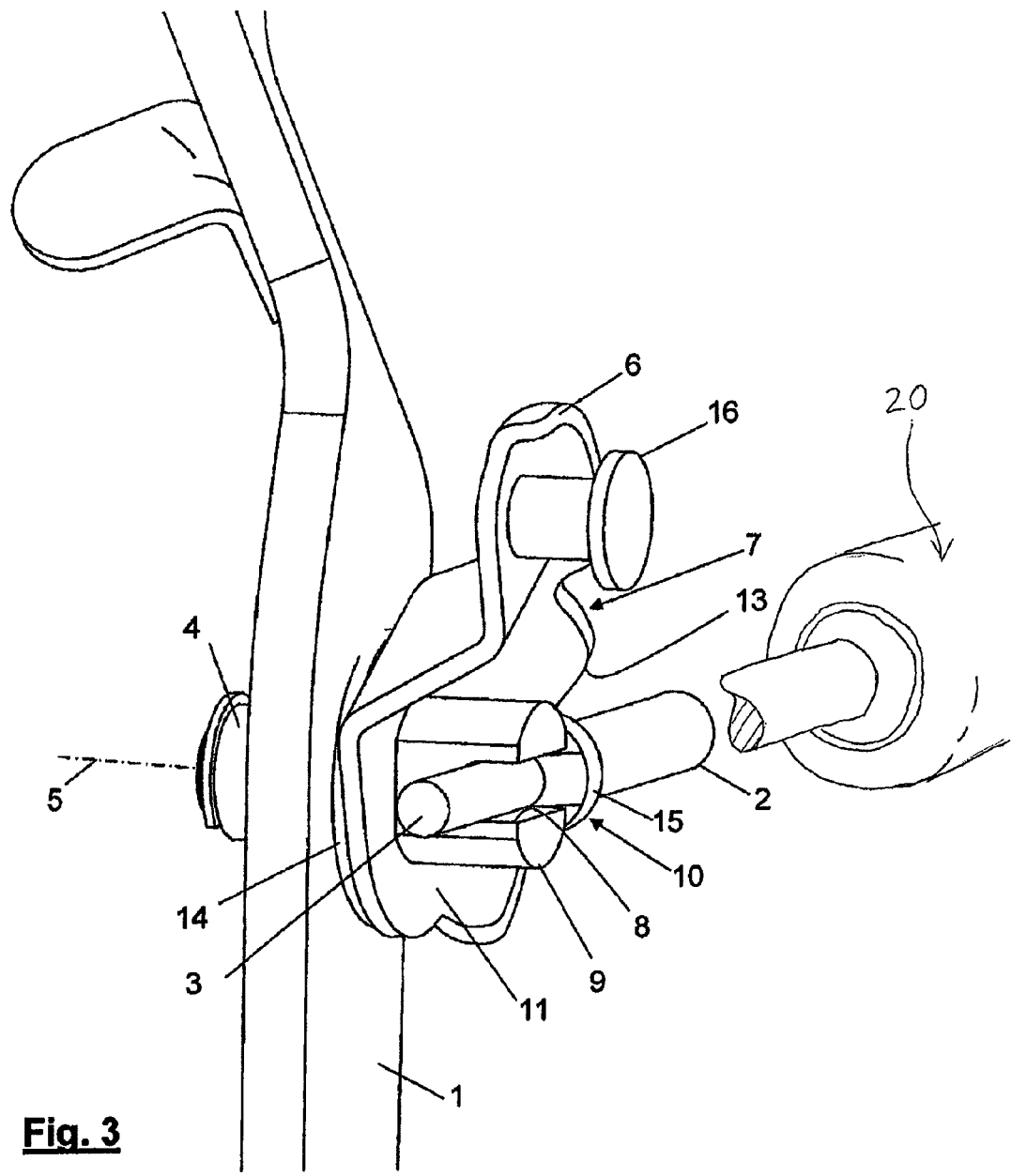
FIG. 3 is a perspective view of the system of FIG. 1.

To do this, as shown in FIGS. 2 and 3, the rod 2 is connected to the pedal 1 by a first spinning body 4, coupled to the pedal and rotatable around an axis 5. The end 3 of the rod is tightly housed in a groove 8 which the end 9 of the first spinning body is provided with. The rotatable nature of the first spinning body 4 permits adapting the connection of the rod 2, whose inclination is constant in normal conditions of use, to the different positions which the pedal may adopt according to its degree of actuation by the driver. Thus, whilst the pedal swings around a spin axis (not shown), when it receives the action of the driver's foot, the rod 2 does not vary its inclination even when being pushed by the pedal, transmitting the force to the device whereto the pedal is connected, e.g. a brake device.

The system further comprises a second spinning body 6, which can rotate around the same axis 5 as the first spinning body.

In the example system, this second spinning body 6 is formed by a plate which comprises an essentially flat portion 11, sandwiched, and rotatable as has been explained above, between the pedal 1 and the rod 2 in its coupling position to the first spinning body 4. A through-hole 12 in the flat portion 11 of the plate permits the end 9 of the first spinning body 4 to traverse the plate, thus permitting the coupling of the end 3 of the rod 2.

The flat portion 11 of said second spinning body 6 is further provided with a pusher element 7, formed by a curved wall 13, the height of the upper edge whereof increasing depending on the rotation direction of the second spinning body 6, so that, if the second spinning body rotates, the upper edge of the curved wall acts by way of a cam on the end 3 of the rod 2, displacing it from the groove 8 of the end 9 of the first spinning body.

For this purpose, the second spinning body 6 is provided with a piston pin 16, which is pushed when a collision or crash occurs, causing it to rotate around the axis 5 of the second spinning body 6 in the direction indicated by the arrow of FIG. 1. When this rotation movement occurs, the upper edge of the wall 13 pushes the end 3 of the rod out of the groove 8 which houses it, disconnecting the pedal 1 from the device.

Unlike in the known systems, the force exerted on the rod 2 is essentially normal for the flat portion 11 of the plate of the second spinning body or, in other words, normal for the body of the pedal 1, in addition to it being a second spinning body 6, other than that which supports or connects the rod 2 to the pedal 1, which causes both to disconnect or uncouple.

To ensure the position of the end 3 of the rod in the groove 8 of the first spinning body, the system comprises retention means 10, formed by a tubular body 14 arranged on the outer surface of the first spinning body 4.

As indicated in FIG. 2, the tubular body 14 is provided with a prolongation 15, parallel to the spin axis 5, which extends through the through-hole 12 of the flat portion 11 of the second spinning body. The prolongation 15 is adapted to retain the end 3 of the rod 2 in the groove 8 which houses it. To do this, the prolongation 15 is provided with a through-hole which is traversed by the rod 2.

In the FIG. 2, it is observed that the inner wall of the prolongation 15 through-hole is provided with a recess or step 17, intended to receive the support of a projection of the rod 2. In the example of the figures, the end 3 of the rod 2 has a smaller diameter than the main portion of said rod, which produces a step 18 on its outer surface, which acts as a projection and rests on said step 17.

When the second spinning body 6 rotates in the direction of the arrow in FIG. 1, the tubular body 14, and its prolongation 15, are dragged by said second spinning body 6, whilst the rod 2, whose end 3 remains inside the groove 8 of the first spinning body 4, does not vary its inclination, meaning the prolongation 15 is obliged to buckle. If the second spinning body continues to rotate, the pusher element 7 also displace the rod 2 out of the groove 8, meaning the prolongation 15 has strain put on it, buckling until breaking, the point when the rod 2 is definitively disconnected from the pedal 1.

The invention claimed is:

1. A system to disconnect a device control pedal (1) from a device to which the device control pedal is connected, said pedal (1) being connected to the device by a rod (2), wherein the rod comprises an end (3) connected to a first spinning body (4), wherein the first spinning body is coupled to the pedal and rotatable around a spin axis (5), wherein the system further comprises a second spinning body (6) provided with a pusher element (7), so that when the second spinning body rotates due to a head-on collision of a vehicle, the rod (2) is displaced due to an action of the pusher element (7) so that the rod is separated from the first spinning body (4) coupled to the pedal.

2. The system according to claim 1, wherein a spin axis of the second spinning body (6) coincides with the spin axis (5) of the first spinning body (4) coupled to the pedal (1).

3. The system according to claim 1, wherein a portion of the end (3) of the rod (2) connected to the first spinning body (4) is housed in a groove (8) located on an end (9) of the first spinning body (4), and wherein the system further comprises retention means (10) to maintain the rod (2) in said groove.

4. The system according to claim 1, wherein the second spinning body (6) comprises an essentially flat portion (11) provided with a through-hole (12), whereby said end (9) of the first spinning body (4) emerges from the through hole, and wherein the pusher element (7) of the second spinning body (6) is formed by a curved wall (13), the height of an upper edge of the curved wall being variable to form a cam that is adapted to displace the rod (2) connected to the first spinning body (4) when the second spinning body (6) rotates around a spin axis of the second spinning body.

5. The system according to claim 4, wherein the retention means (10) are comprised of a tubular body (14), coaxial to the first spinning body (4) and arranged externally with respect to said first spinning body, the tubular body (14) being provided with a projection (15), essentially parallel to the spin axis, of a material which can be plastically deformed until broken when subjected to a strain greater than a certain value, wherein the projection extends through the through-hole (12) of the flat portion (11) of the second spinning body (6) and is adapted to clasp the rod (2) preventing the rod from coming out of the groove (8) on the end (9) of the first spinning body (4) wherein the rod is housed.

6. The system according to claim 1, wherein the device control pedal is a brake pedal of a vehicle, wherein the brake pedal is configured to receive an action of a foot and transmit a force thereof to a brake device to be controlled.

7. The system according to claim 1, wherein the pusher element on the second spinning body and the groove are configured such that the rod is displaced in a direction transverse to a longitudinal direction of the rod when the second spinning body rotates so as to slide out of the groove.

8. A system for disconnecting a control pedal from a device being controlled, the system comprising:
  a rod for connecting the device to the control pedal;
  a first rotating body mounted on the control pedal, wherein the first rotating body is connected to the rod, thereby connecting the rod to the control pedal;
  a second rotating body mounted on the control pedal comprising a surface having a variable height as the second rotating body rotates;
  wherein the second rotating body is configured to rotate during a collision such that the surface having a variable height applies a force on the rod to disconnect the rod from the first rotating body.

9. The system for disconnecting a control pedal from a device being controlled according to claim 8, wherein the first rotating body and the second rotating body are rotatable around the same axis.

10. The system for disconnecting a control pedal from a device being controlled according to claim 8, wherein the first rotating body comprises a groove;
  wherein the rod is disposed in the groove to connect the rod to the first rotating body;
  wherein the rod is displaced in a direction transverse to a longitudinal direction of the rod when the second rotating body rotates so as to slide out of the groove.

* * * * *